Jan. 20, 1970   A. MARZOCCHI ET AL   3,490,985
METHOD OF COATING GLASS FABRIC AND ARTICLE PRODUCED THEREBY
Filed Sept. 30, 1966

ALFRED MARZOCCHI,
EDWARD A. MORRIS &
ALBERT E. TAMOSAUSKAS
INVENTORS

BY
*Staelin & Overman*
ATTORNEYS

United States Patent Office 3,490,985
Patented Jan. 20, 1970

3,490,985
METHOD OF COATING GLASS FABRIC AND
ARTICLE PRODUCED THEREBY
Alfred Marzocchi, Cumberland, R.I., Edward A. Morris, Columbia, S.C., and Albert E. Tamosauskas, Blackstone, Mass., assignors to Owens-Corning Fiberglas Corporation, a corporation of Delaware
Filed Sept. 30, 1966, Ser. No. 583,283
Int. Cl. C03c 25/02
U.S. Cl. 161—93                     12 Claims

ABSTRACT OF THE DISCLOSURE

Decorated woven glass fabric produced by selecting two different types of interwoven strands and applying a mixture of thermoplastic resin, foaming agent and plasticizer over areas of the fabric which include the two different types of strands. The foaming agent reacts to foam the mixture in situ about the adjacent portion of both types of strands to provide flexible raised areas of foamed resin. The foamed resin being poorly coupled to one type of strand, but strongly coupled to the other.

---

The present invention relates to a new and improved method of producing decorative areas, that may include pigments, on glass fibers; and to the decorative glass fabrics produced thereby.

The problem of dyeing or otherwise fixing colored materials or pigments to glass fabrics has been a troublesome one because of the inert nature of glass. It has not been practical to introduce pigments into the glass materials to color the glass itself, because many of the pigments which would be used to color the glass would cause the glass to crystallize and lose strength. These materials also may adversely effect the viscosity, and other properties necessary for the good attenuation of the glass. All of the colored glass fabrics produced today, therefore, have a pigmented natural or synthetic resin coating on the fibers which is preferably secured to the glass fibers by a bonding agent. All of these coated fibers suffer from the defect that the coating can be removed by washing and scrubbing actions, and a common test for the durability of the colored coating is to subject the colored fabric to a certain number of washings (usually ten) in a washing machine. Usually a noticeable deterioration in color can be observed at the folded over portions of the fabric which occur at a hem. In some instances, the removal of the color at the folds will be complete; and in other instances it may be partial, depending upon the amount of resin used to form the coating, and the type of chemical bond that is used to adhere this coating to the glass.

Glass fabrics which are used as textiles must be flexible so that it will have good drape and "hand", and can be fabricated with the usual cutting and sewing operations. In order that coated fabrics will be sufficiently flexible, it has been necessary heretofore, to limit the amount of coating materials applied. Because the pigments are held in the coatings, fabrics, heretofore, could only experience a limited amount of abrasion before losing color at the folds in the hems or seams of the finished textile material.

It is an object of the present invention, therefore, to provide a new and improved colored glass fabric which will withstand more abrasion without losing its color than has been produced heretofore.

Another object of the invention is the provision of a new and improved method of securing pigment to a glass fabric.

Another object of the invention is the provision of a new and improved method of printing patterns on glass fabrics.

A still further object of the invention is the provision of a new and improved glass fabric having a raised surface, and which nevertheless is flexible and has a good "hand."

Further objects and advantages of the invention will become apparent to those skilled in the art to which it relates from the following description of several preferred materials and methods of producing the same described with reference to the accompanying drawing forming a part of this specification, and in which.

Figure 1:
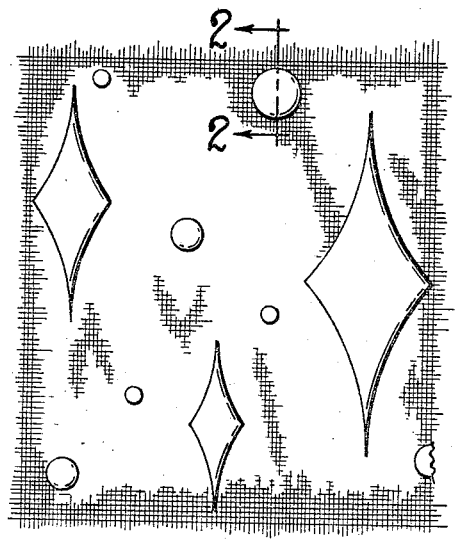
FIG. 1 is a plan view of a glass fabric having a raised pattern produced in accordance with the present invention.

It has been found that a plastic resin which is plasticized to a gelatinous consistency will when applied to glass fabrics, not run along the fibers at the edge of a pattern to produce a "halo" effect, even though the fibers have been made oleophilic. It has also been found that glass fabrics having a very thick coating of a plastic foamed thereon can be flexible and have an acceptable "hand", if the resin is not chemically bonded to the fabric, but is mechanically held in place by portions of the foam which surround some of the fibers at spaced apart locations. It has been found that the above recited flexible structure can be achieved by coating the fibers of the fabric with a lubricious oleophilic material that is coupled to the fibers of the glass, but which will not chemically bond to the plastic resin when foamed. It has further been found that a gelatinous foamable plastic resin can be applied to one surface of a fabric and forced down into the fabric to cause the gel to exude only through the larger openings in the fabric; and it has further been found that these exudations can be foamed to form loops around some of the fibers without coating the back side of the fabric. Such a structure is very flexible since the fibers slip through the foamed plastic to some extent, but are nevertheless firmly retained onto the fabric. It has further been found that very good mechanical retention of the foam is had on texturized yarns that are coated with lubricious oleophilic materials that are coupled to the glass. A desired degree of retention of the foam can be had with lubricious oleophilic material by tailoring the glass fabric to contain a desired amount of texturized yarn. It has further been found that by using texturized yarn for the strands running in only one direction of the fabric, the foamed coated fabric will flex very easily in the direction and be somewhat stiffer when flexed in the direction at right angles thereto. By causing the texturized yarn to extend in the lengthwise direction of the fabric, therefore, the foamed coated fabric can be used for draperies and the like where the fabric is gathered together in folds running lengthwise of the fabric. Texturized glass fiber yarn consists of strands of glass mono-filaments which are blown apart, or otherwise caused to have some of the mono-filaments separated from each other, to provide an open filament structure.

Resin, when applied in the manner above described and expanded, foams upwardly from the coated surface without coating the surface of the fibers on the back side of the fabric, except in the area of the exudations. The resin expands several times the thickness of the glass fabric, and normally it would be expected that such a thickness would make the fabric too stiff for use as draperies, shower curtains, and the like. It would also be expected that glass fabric having such a thickness of binder thereon would concentrate stress on the fibers when creased or doubled upon themselves, as usually occurs in resin impregnated glass fabrics. In the structures produced as above described, the coated regions are readily bent back upon themselves because the fibers are free to move relative to the foam, and thus avoid stress concentrations. In addition, mutual abrasion between the fibers is substantially eliminated because of the lubricious oleophilic coating of the glass filaments. It will therefore be seen, that the present invention provides glass fabrics having thick coatings thereon, which nevertheless are flexible, have good "hand", and can be used for normal textile usage involving repeated flexure, without deterioration by stress concentration or mutual abrasion. Patterns of the foamed thermo plastic resin applied to glass fabrics as above described can withstand a substantially unlimited number of washings in washing machines. By incorporating pigments into the resins that are foamed in situ, colored prints can be applied to the fabric that withstand an unlimited number of washings without color fade. Not only is the pigment carried in an appreciable thickness of material, but the resilient properties of the foamed resin, prevents abrasion from eroding the pigments away, with the result that colored prints produced in accordance with the present invention have unlimited life.

EXAMPLE 1

A pattern of the nature shown in the drawings is produced on glass fabric by silk screening the following composition to the upper surface of a glass fabric laid upon a suitable flat surface:

| Polyvinyl chloride resin: | Parts |
| --- | --- |
| (Monsanto 410 resin-normal M.W.) | 50 |
| (Monsanto R3142 resin-low M.W.) | 50 |
| Dioctyl phthalate | 20 |
| Di-iso-decyl phthalate | 50 |
| Calcium carbonate filler | 10 |
| $Sb_2O_3$ fire retardant | 5 |
| Lead phosphite activator and stabilizer | 5 |
| Polyethylene glycol | 2 |
| Diluent-kerosene | 10–15 |
| Blowing agent (azobisformamide) solid | 5 |
| RBH pigment | 3–10 |

The fabric used has a fifty-five woof of 408 filament strands per inch and a warp comprising pairs of texturized 408 filament yarns spaced apart by a pair of 408 filament untexturized strands with the total strands and rovings numbering 32 per inch. The strands of both the warp and the woof were coated at forming with a conventional starch size material, followed by immersion in a 2% aqueous solution of "Quilon."[1] The untexturized warp had undergone a considerably greater amount of flexure so that the starch size on its strands was largely discontinuous.

Figure 3:
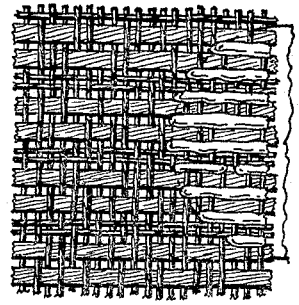
FIG. 3 is a plan view of the under side of the fabric.

Referring to FIG. 3 of the drawing, it will be seen that the plastic material has been forced down through the openings between the warp and woof and had moved around the portions of the woof which overlie the warp. The plastic does not penetrate between the filaments of the Quilon coated woof strands so that the strands of the woof can move relative to the foamed plastic. The plastic upon foaming in situ does penetrate between the filaments of the texturized warp to achieve a tight bond thereto. The texturized warp was formed by passing 408 filament strand through an air jet.

The foamable mixture of Example 1 was produced by adding the pigments to plasticizer in a Hobart mixer. The fillers and fire retardant were mixed with part of the plasticizer in a small mixer to a uniform blend, and this uniform blend was then added to the Hobart mixer. Thereafter the 100 parts of the normal and low molecular weight polyvinyl chloride resin powders were added to the Hobart mixer and blended until homogeneous. The temperature of the ingredients in the Hobart mixer was prevented from rising above 90° F. by the addition of a small amount of the diluent. Thereafter, the remainder of the diluent was added and mixed until homogeneous, following which the polyethylene glycol was added. The plastisol was stored at 80° F. for a day before application to the glass fabric.

A blend of normal molecular weight and low molecular weight polyvinyl chloride resin powders was used in order to obtain the proper consistency. The consistency of the plastisol should be varied by a blend rather than by varying the amount of plasticizer and diluent that is used.

Any suitable plasticizer for the polyvinyl chloride resin can be used, provided they are not used in an amount greater than that which the gelatinous structure of the plastisol can hold without exudation of the plasticizer and/or diluent. The di-iso-decyl phthalate was chosen because it produces a good gelatinous structure and the dioctyl phthalate was used to extend the more expensive di-iso-decyl phthalate.

The plastisol can be applied to the glass fabric in any suitable manner, such as by a roll, scraper, or by means of a spray, and can conveniently be applied using a silk screen process using a scraper to force the gelatinous plastisol through the silk screen. The gelatinous plastisol is preferably supplied with sufficient force to produce a slight exudation through the larger holes in the weave of the fabric.

The filler is not necessary, but is used to reduce the cost and impart toughness and durability. Any suitable filler can be used, such as atomite, clay, barytes, Super-floss, and Surflex. Super-floss and Surflex are trade names for commercially available inert fillers. Fire retardant is not necessary, but is used for the purpose indicated, and it also acts as a filler. The activator and stabilizer is not necessary but is desirable to speed up the curing process and at the same time allow the material to be stored several days before use. This material also acts as a filler.

The polyethylene glycol suppresses viscosity and/or provides a viscosity control, but is not necessary in all instances. A small amount of polyethylene glycol lowers the initial viscosity, and is helpful particularly when fillers are used.

Pigments may or may not be used depending upon whether color is desired. One of the big advantages of the present invention, however, is that pigment is retained through a sufficient depth of material that the color is not lost upon repeated washings in a washing machine. Any suitable pigment can be used including the common commercial organic and inorganic pigments.

Diluents, such as kerosene, are used to extend the plasticizers and control their viscosity. Other diluents can be used, such as stoddard solvent, toluene, benzene, or other aromatic solvents. The diluent is preferably selected for its compatibility with both the resin and the plasticizer, as is well understood in the art. In the present invention, however, the amount which is used is kept below that which the network of the gelatinous plastisol can hold without slow exudation of diluent and/or plasticizer. By so doing, prints can be made on the glass fabric without "halo."

Any suitable blowing agent can be used to provide the gas necessary to expand the plastisol. Among those which

---

[1] Quilon is a trade name of a commercially available Werner complex of chromium and a fatty acid.

are commonly used are azobisformamide, azobisisobutyronitrile, diazoaminobenzene, n-nitrosol compounds, such as dinitrosoterephthalamide, and dinitrosopenta methylene tetramine, sulfonylhydrazides, such as benzenesulfonyl hydrazide, benzene 1, 3-disulfonyl hydrazide, diphenylsulfon 3.3'-disulfonyl hydrazide, and 4,4' oxybisulfonyl hydrazide. The blowing agent is selected to liberate gas at a temperature at which the resin and plasticizer used will have a proper viscosity as is well understood in the art. The pigment and/or fillers provide nuclei which in turn help to control cellulation as is well understood in the art.

Figure 2:
FIG. 2 is a cross sectional view taken along the line 2—2 of FIG. 1.

The type of foam and fabric structure that is produced by the procedure of Example 1 is shown in FIGS. 1, 2, and 3 of the drawings. It will be seen that the foamed resin is only adhered to one side of the glass fabric without wetting the other surface. The foam is retained by adhesion to one side of the fabric, plus additional occasional loops of the foamed plastic extending to the back side of the fabric and surrounding fibers. These loops are formed by material which has exuded through the larger openings in the weave of the fabric and are then expanded laterally upon foaming to unite and solidify. FIG. 3 of the drawing illustrates that texturized yarn is larger and more bulky than untexturized strand to produce openings between the texturized yarn and the parallel adjacent strands of the warp. By pressing the plastisol onto the top surface of the fabric, the plastisol is forced down through these larger openings in what appeared to be rows of exudations on either side of the texturized strands forming the woof in groups which extend generally longitudinally of the fabric. The fabric shown in FIGS. 1, 2, and 3 of the drawing, therefore, can be folded over upon itself longitudinally of the fabric more easily than it can be folded over in the direction parallel to the woof. The material is therefore suitable for forming draperies and shower curtains and the like, even though it has a thick raised pattern thereon. The material is very durable and can be washed repeatedly without damaging the glass fibers or wearing away the pigment. The lubricious oleophilic coating previously referred to, not only aids in achieving flexibility, but provides exceedingly good protection against mutual abrasion between the filaments of the strands and yarn.

Other lubricious coating materials which bond to the surface of the glass can be used to provide the lubricious oleophilic surface to the glass. Some of these materials are the silicones, metal complexes of fatty acids, and the florinated alcohol and/or fatty acid complexes of chromium and/or other complexing metals.

It will be apparent that the present invention provides a means of tailoring the bond achieved by a foamed plastic to the surface of a glass fabric. This tailoring is achieved by utilizing open stranded texturized yarns for some of the fibers running in one or both directions of the fabric. In the preferred embodiment, however, the yarn is confined to the fibers running in only one direction, and most preferably lengthwise of the fabric. The plastisol penetrates the yarn to some degree to achieve a bond strength to the yarn which is considerably above that which is achieved to the strand. This not only increases the flexibility of the fabric, but by using yarn for the fibers running in one direction only, produces a fabric which can be pleated or folded as is necessary in draperies and the like. This tailored bond allows flexibility to be achieved in foamed patterns, having a foam thickness two or three times the thickness of the fabric itself. The use of the lubricious material previously referred to also increases flexibility by allowing the untexturized strands to move relative to the foam upon flexing. Since all of the woof in the embodiment shown in the drawing is untexturized and coated, the material of the drawing has great flexibility when folded in a direction parallel to the warp.

The fabrics of the present invention can be produced with any foamable resin which remain plastic after foaming. Other suitable resins include flexible polyesters, polyurethanes, polystyrenes, polyethylenes, polypropylenes, polyamides, etc.

EXAMPLE 2

By way of example, a plastisol of the following composition was prepared in the same manner given above for Example 1:

|  | Parts by weight |
|---|---|
| Polyvinyl chloride resin (high molecular weight) | 100 |
| Polyester resin (high molecular weight made by reacting phthalic anhydride and ethylene glycol in equal molar proportions) | 35 |
| Dioctyl phthalate | 35 |
| Lead phosphite stabilizer | 2 |
| Pigment | 5 |
| $Sb_2O_3$ fire retardant | 3 |
| Dinitrosoterephthalamide blowing agent | 5 |

This material when prepared and applied to the fabric as given in Example 1, provided a foamed coating on the fabric having the same general properties as did the fabric produced in Example 1.

EXAMPLE 3

A plastisol of the following composition was prepared in the same manner as that of Example 1:

|  | Parts by weight |
|---|---|
| Polyvinyl chloride resin powder (high molecular weight) | 100 |
| Diisodecyl phthalate | 40 |
| Dinormaloctyl phosphate plasticizer | 20 |
| Epoxydized soy bean oil | 7.5 |
| Aluminum powder pigment | 3 |
| $Sb_2O_3$ fire retardant | 4 |
| Lead phosphite stabilizer | 4 |
| Diluent Sovasol 5 | 5 |
| Diazolamino benzine blowing agent | 5 |

This material likewise when applied to the same fabric used in Example 1 and foamed, provides a flexible foamed-fabric combination having the same general properties as described above for Example 1.

In general, suitable plastisols which will not produce "halo" will have the following range of composition:

| | |
|---|---|
| Resin | 100 |
| Plasticizer | 40–80 |
| Fillers | 0–10 |
| Pigments | 0–35 |
| Stabilizers | 0–4 |
| Fire retardant | 0–5 |
| Surface active agents | 0–1 |
| Diluent, not more than approximately 20. | |

It will be apparent that the objects heretofore enumerated as well as others have been accomplished, and that there have been provided fabrics having pigmented plastic patterns thereon which are not only durable and retain their color, but are flexible and have acceptable hand and drape for use as textiles.

We claim:
1. A method of producing decorated glass fabrics comprising: selecting a woven fabric comprising two different types of securely interwoven strands one type of which is not appreciably bonded to by a predetermined thermoplastic resin, and the other of which produces a stronger bond with respect to the predetermined thermoplastic resin, and both types of which are firmly but slidingly held by each other; applying a mixture of said thermoplastic resin, a foaming agent, and a plasticizer generally uniformly over areas of the fabric that include both types of strands; and thereafter causing said foaming agent to foam the mixture uniformly in situ about adjacent portions of both types of strands to provide flexible raised areas of foamed resin poorly coupled to one type of strand, but strongly retained by the other type of strand.

2. The method of claim 1 wherein the thermoplastic resin is polyvinyl chloride.

3. The method of claim 1 wherein said other type of strand is a texturized strand.

4. The method of claim 3 wherein said texturized strand is in the warp only.

5. The method of claim 4 wherein the texturized and untexturized strands have a coating thereon comprising a Werner complex of chromium and a fatty acid at the time the resin is applied to said strands.

6. The method of claim 5 wherein said mixture is applied by a silk screening process.

7. A decorated woven glass fabric comprising: texturized glass fiber strands securely interwoven with untexturized glass fiber strands, both strands being coated with a lubricious oleophilic material; and a thermoplastic resin foamed in situ about said lubricious oleophilic coating of adjacent untexturized and texturized strands to a generally uniform height.

8. The decorated glass fabric of claim 1 wherein the thermoplastic resin is polyvinyl chloride.

9. The decorated woven glass fabric of claim 7 wherein said oleophilic coating contains a Werner complex of chromium and a fatty acid.

10. A method of producing decorated glass fabrics comprising: selecting a woven fabric of texturized glass fiber strands coated with a lubricious oleophilic material firmly held by untexturized glass fiber strands coated with a lubricious oleophilic material as a base to receive a decorative resin coating; applying a mixture of a thermoplastic resin, a foaming agent, and a plasticizer generally uniformly to both texturized and untexturized strands of areas of the glass fabric; and thereafter causing said foaming agent to foam the mixture in situ about the fibers to provide flexible raised areas of resin mechanically held to said fibers.

11. The method of claim 10 wherein the texturized strand is in the warp only.

12. The method of claim 10 wherein said resin mixture is embedded onto one surface of the fabric with sufficient force to cause the mixture to exude only through the larger openings in the fabric, and wherein the mixture is foamed to a degree causing the exuded portion of the mixture to join up on the back side of the fabric.

References Cited

UNITED STATES PATENTS

| | | | |
|---|---|---|---|
| 2,920,977 | 1/1960 | Adams | 117—15 |
| 2,955,053 | 10/1960 | Roth. | |
| 2,961,332 | 11/1960 | Nairn | 117—15 |

ALFRED L. LEAVITT, Primary Examiner

M. F. ESPOSITO, Assistant Examiner

U.S. Cl. X.R.

117—37, 38, 45, 72, 126; 161—159